United States Patent [19]

Rau

[11] 4,151,457

[45] * Apr. 24, 1979

[54] MICROWAVE METHOD AND APPARATUS FOR DETERMINATION OF ADSORBED FLUID IN SUBSURFACE FORMATIONS

[75] Inventor: Rama N. Rau, Danbury, Conn.

[73] Assignee: Schlumberger Technology Corporation, New York, N.Y.

[*] Notice: The portion of the term of this patent subsequent to Feb. 28, 1995, has been disclaimed.

[21] Appl. No.: 783,093

[22] Filed: Mar. 31, 1977

Related U.S. Application Data

[63] Continuation-in-part of Ser. No. 674,792, Apr. 8, 1976, Pat. No. 4,077,003.

[51] Int. Cl.² .......................... G01V 3/18; G01V 3/12
[52] U.S. Cl. ....................................................... 324/6
[58] Field of Search ...................... 324/1, 6–8

[56] References Cited

U.S. PATENT DOCUMENTS

| | | | |
|---|---|---|---|
| 3,849,721 | 11/1974 | Calvert | 324/6 |
| 3,891,916 | 6/1975 | Meador et al. | 324/6 |

FOREIGN PATENT DOCUMENTS

| | | | |
|---|---|---|---|
| 212387 | 5/1969 | U.S.S.R. | 324/6 |
| 272450 | 6/1970 | U.S.S.R. | 324/6 |
| 505978 | 3/1976 | U.S.S.R. | 324/6 |

*Primary Examiner*—Gerard R. Strecker
*Attorney, Agent, or Firm*—Martin M. Novack; Kenneth Olsen; Bruce N. Carpenter

[57] ABSTRACT

An apparatus and method for determining the amount of adsorbed fluid in formations surrounding a borehole. In accordance with the present invention, means are provided for deriving a first quantity which is a function of the dielectric constant of the formations as measured by passing electromagnetic energy of a first frequency through the formations. Means are also provided for deriving a second quantity which is a function of the dielectric constant of the formations as measured by passing electromagnetic energy of a second frequency through the formations. Finally, means are provided for determining the amount of adsorbed fluid in the formations as a function of the difference between the first and second quantities. In a preferred embodiment of the invention, the means for deriving the first and second quantities comprise means for transmitting microwave electromagnetic energy through the formations and measuring the relative phase shift and attenuation of the microwave electromagnetic energy in traversing the formations of interest.

27 Claims, 10 Drawing Figures

MICROWAVE METHOD AND APPARATUS FOR DETERMINATION OF ADSORBED FLUID IN SUBSURFACE FORMATIONS

BACKGROUND OF THE INVENTION

This is a continuation-in-part of U.S. Application Ser. No. 674,792 filed Apr. 8, 1976, now U.S. Pat. No. 4,077,003.

This invention relates to the investigation of earth formations and, more particularly, to an apparatus and method for determining the amount of adsorbed or "bound" fluid in formations surrounding a borehole. The subject matter of this invention is related to subject matter disclosed in copending U.S. Application Ser. No. 674,791 of Rama Rau and Jean Suau, filed on the same date as the parent hereof and assigned to the same assignee and now U.S. Pat. No. 4,063,151.

Modern well logging techniques have advanced to a point where a number of subsurface parameters, for example porosity and lithology, can often be determined with reasonable accuracy. However, a reliable technique for determining the permeability of formations (i.e., a measure of the ease with which fluid can flow through a pore system), has not been forthcoming. Resistivity gradients have been used to estimate the order of magnitude of formation permeability, but this technique is found useful only in certain types of formations. It has been suggested that a measurement of the amount of "free fluid" is shaly sands would be a good permeability indicator. A known technique for measuring "free fluid" is the nuclear magnetic resonance tool, but attainable signal-to-noise ratios tend to be a limiting factor of performance for this tool.

Before discussing a new approach to the determination of the amount of free fluid in formations, it is helpful to discuss a recent development in the determination of dielectric properties of subsurface formations. In the past there were proposed various techniques for measuring the dielectric constant or electric permittivity of subsurface formations. Prior investigators recognized that the dielectric constant of the different constituents of earth formations vary widely (e.g., 2.2 for oil, 7.5 for limestone and 80 for water) and that the measurement of dielectric properties therefore holds promise of being a useful means of formation evaluation. However, prior art instruments for logging of dielectric properties of formations surrounding a borehole did not achieve hoped-for success for a variety of reasons. The dielectric constant of a lossy material can be expressed as a complex quantity of the form $$\epsilon^* = \epsilon' + j\epsilon''$$

The real part $\epsilon'$ in this equation represents the "true" dielectric constant of the material in lossless form; i.e., the measure of displacement currents for a particular electric field in the material if it were lossless. The imaginery part $\epsilon''$ represents the dielectric "loss factor" of the material; i.e., the losses due to conduction and relaxation effects. Most previous efforts have been concerned with determining the value of $\epsilon'$ for a particular portion of subsurface formation. However, subsurface formation materials often have appreciable conductivity and thus a significant loss factor $\epsilon''$ which is greater in magnitude than $\epsilon$. Since loss factor is necessarily measured to some extent when attempting to measure $\epsilon'$, the attainment of accurate values of $\epsilon'$ was until recently largely frustrated by the presence of a significant loss factor. An advance in this art is demonstrated in U.S. Pat. No. 3,849,721 as well as in U.S. Pat. No. 3,944,910 of R. Rau, assigned to the present assignee, which discloses an apparatus and method for determining dielectric properties of formations by injecting microwave electromagnetic energy into the formations and then taking measurements which determine the velocity of propagation of the microwave energy. In this technique the loss factor due to conductivity, which varies inversely with frequency, is kept small by employing relatively high frequency electromagnetic energy in the microwave portion of the spectrum. Also, the referenced application discloses a technique whereby a correction can be introduced which takes into account inaccuracies caused by conductivity.

The techniques described in the referenced patent and copending application are considered significant advances in the art, and it is one objective of the present invention to extend the types of techniques utilized therein to further advance the well logging art by enabling the obtainment of useful information about the amount of adsorbed fluid in subsurface formations as well as a further understanding of the relationships between "adsorbed" and "free" fluids in subsurface formations. Since the "total fluid" can be considered as the sum of the "free" fluid and the adsorbed (or "bound") fluid, and since total fluid can generally be determined from obtainable porosity and saturation information, if available, it will be understood that in references herein to determination of adsorbed fluid, it is implicit that free fluid could also be determined, if desired.

It is known that dielectric relaxation of ice occurs at radio frequencies and that the dielectric relaxation of free water occurs in the microwave region. Researchers have therefore suggested that loss measurements could be used to estimate the quantity of free water in a crystalline system. See, for example, "Progress In Dielectrics" Volume III, Edited by J. B. Birks and published by John Wiley Inc. (1961) and "Dielectric Relaxation of Surface Adsorbed Water," by Hoekstra and Doyle, Journal of Colliod and Interface Science, Vol. 36, No. 4 (1971). These measurements can be made in a laboratory but, since the dielectric relaxation frequency of free water is of the order of 10 GHz, there is difficulty in obtaining meaningful loss measurements at such high frequencies in a borehole environment where it is usually necessary to operate through a mudcake and the retrieving of signals at measurable amplitudes and reasonable signal-to-noise ratios is required.

Prior researchers have also speculated concerning the properties of adsorbed water (e.g. in the above references), and it has been suggested that adsorbed water has properties intermediate between ice and water and that dielectric spectroscopy could be a useful technique in elucidating the properties of adsorbed water. Some experimental work, such as set forth in the above referenced publications, has been performed along these lines in laboratory environments and in the study of, for example, ice/water/clay systems. However, the techniques employed to make laboratory measurements and the overall methods of approach do not lend themselves to obtaining useful information about subsurface formations surrounding a borehole.

In laboratory experiments it is possible to control various parameters in order to obtain information about one or more parameters under investigation. For example, in a prior art laboratory investigation of adsorbed or "bound" water in a particular system the effects of free water were virtually eliminated by freezing the system, and then a number of measurements were taken which reflected the effect of the bound water. Unfortunately, techniques of this type, as well as most laboratory techniques which involve control over the medium being measured, cannot be employed in a borehole environment. Also, practicalities of time in well logging applications limit the number of measurements that can be taken at each depth level.

SUMMARY OF THE INVENTION

Applicants have discovered that measurements of $\epsilon'$ and/or $\epsilon''$, or of quantities which depend on $\epsilon'$ and/or $\epsilon''$, taken in a borehole at first and second frequencies, can be utilized to determine the amount of adsorbed fluid in the formations surrounding the borehole position at which the measurements are taken.

Applicants have observed, for example, that $\epsilon'$ of adsorbed water, as determined from measurements at a first frequency below about 1 GHz ($10^9$ hertz) is greater than $\epsilon'$ of the same adsorbed water as determined from measurements at a second frequency above about 1.1 GHz. At frequencies below 1 GHz, and above about 1.1 GHz, the $\epsilon'$ vs. frequency characteristic of adsorbed water is generally flat so, in order to minimize any uncertainty as to the frequency band in which $\epsilon'$ of adsorbed water falls from its upper to its lower value, it is preferable to select the first frequency substantially below 1.0 GHz and the second frequency substantially above 1.1 GHz; e.g., at frequencies of 0.5 GHz and 1.5 GHz, respectively. Since the $\epsilon'$ of the free water has a generally flat frequency characteristic over the frequency range of interest, the contribution which the free water makes to the measurements will be substantially the same at both the first and second frequencies, so that difference between the determined values at the first and second frequencies is indicative of the amount of adsorbed water in the formations.

Concerning $\epsilon''$, applicants have observed that when $\epsilon''$ is determined from measurements at a first frequency below about 0.5 GHz, for example at 0.33 GHz, and $\epsilon''$ is also determined from measurements at a second frequency of about 1 GHz, the relationship between the two determined values of $\epsilon''$ is substantially different for adsorbed water than it is for free water. For example, measurements taken on a formation sample at a first frequency of 0.33 GHz and a second frequency of 1 GHz result in loss factor values respectively designated as $\epsilon_1''$ and $\epsilon_2''$. Having determined a value of $\epsilon_1''$ from the measurement at the first frequency, the expected $\epsilon_2''$ for a formation containing almost exclusively free water is determined. The amount by which the actual $\epsilon_2''$ (obtained from the measurement at the second frequency) exceeds the expected $\epsilon_2''$ is indicative of the amount of adsorbed water in the formations under investigation.

The present invention is directed to an apparatus and method for determining the amount of adsorbed fluid in formations surrounding a borehole. In accordance with a first embodiment of the present invention, means are provided for deriving a first quantity which is a function of the dielectric constant of the formations as measured by passing electromagnetic energy of a first frequency through the formations. Means are also provided for deriving a second quantity which is a function of the dielectric constant of the formations as measured by passing electromagnetic energy of a second frequency through the formations. Finally, means are provided for determining the amount of adsorbed fluid in the formations as a function of the difference between the first and second quantities. In the preferred embodiments of the invention, the means for deriving the first and second quantities comprise means for transmitting microwave electromagnetic energy through the formations and measuring the relative phase shift and attenuation of the microwave electromagnetic energy in traversing the formations of interest. In this first embodiment, the first frequency is selected as being above about 1.1 GHz and the second frequency is selected as being below about 1.0 GHz.

In accordance with a second embodiment of the present invention, means are provided for deriving a first quantity which is a function of the dielectric loss factor of the formations as measured by passing electromagnetic energy of a first frequency through the formations. Means are also provided for deriving a second quantity which is a function of the dielectric loss factor of the formations as measured by passing electromagnetic energy of a second frequency through the formations. Finally, means are provided for determining the amount of adsorbed fluid in the formations as a function of the first and second quantities. In this embodiment, the means for determining the amount of adsorbed fluid comprises means for detecting the weighted difference between the first and second quantities, the weightings of the weighted difference being a function of the ratio between the first and second frequencies. Also, in this embodiment, it is preferred that the first frequency be below about 0.5 GHz and the second frequency be about 1 GHz.

In accordance with a further embodiment of the invention, first and second quantities are derived as a function of the loss tangent of the formations as measured by passing electromagnetic energy of first and second frequencies, respectively, through the formations.

Further features and advantages of the invention will become more readily apparent from the following detailed description when taken in conjunction with the accompanying drawings.

DESCRIPTION OF THE PREFERRED EMBODIMENT

Before proceeding to describe the apparatus and method of the present invention in detail, it is helpful in understanding the invention to review subject matter developed in the abovereferenced copending U.S. Pat. No. 3,944,910 of Rau.

Consider a plane electromagnetic wave propagating in a lossless dielectric medium. The wave propagates with a velocity $$v = \frac{1}{\sqrt{\mu\epsilon}} \tag{1}$$

where $\mu$ is the magnetic permeability and $\epsilon$ the dielectric constant of the medium. If the type of materials under consideration are generally non-magnetic, $\mu$ can be considered as a known constant and $\epsilon$ can be determined from the relationship $$\epsilon = \frac{1}{\mu v^2}. \tag{2}$$

Next, consider two points in fixed space relation along the direction of propagation of the wave. For a given angular frequency, $\omega$, the phase difference of the wave as between the two points is $$\phi = \frac{\omega L}{v} = \beta L \tag{3}$$

where L is the distance separating the two points and $\beta$ is the phase constant of the wave as defined by $\beta = \omega/v$. Substituting from equation (3) it is seen that $\epsilon$ can be obtained after determination of the phase constant from the relationship $\beta = \omega\sqrt{\mu\epsilon}$ as $$\epsilon = \frac{\beta^2}{\omega^2\mu} \tag{4}$$

In terms of the phase measured between two points, the appropriate expression is $$\epsilon = \frac{\phi^2}{\omega^2 L^2 \mu} \tag{5}$$

The preceding relationships are valid for a lossless material, but subsurface media of interest generally have appreciable conductivity. The propagation constant, $\gamma$, of a plane electromagnetic wave propagating in a lossy medium is a complex quantity of the form $$\gamma = \omega\sqrt{\mu\epsilon}\sqrt{1 + j\frac{\tau}{\omega\epsilon}} \tag{6}$$

where $\delta$ is the conductivity of the medium. When $\delta/\omega\epsilon$ is much greater than 1, the propagation constant reduces to the form set forth above in the Background. For the case where $\delta$ is zero or very small, the "loss tangent" term $\delta/\omega\epsilon$ can be neglected and we have $\gamma = \beta = \omega\sqrt{\omega\epsilon}$ which is consistent with equation (4) for the lossless case. When $\delta$ is significant, however, the loss tangent term can be kept relatively small by having $\omega$ very large. In such case, the equation (4) is again approximately valid. For example, when $\delta/\omega\epsilon = 0.2$, a calculation of $\epsilon$ in accordance with equation (4) yields only about a 0.5% error as compared to the case where $\delta/\omega\epsilon$ is zero.

As discussed in the referenced Rau application, there are practical limits on how high a frequency can be used in making meaningful measurements in a borehole. Thus, for formations of appreciable conductivity, the use of the highest practical frequencies may still result in a significant loss tangent which, if ignored, will lead to error in measuring the apparent value of dielectric constant. In one embodiment of the present invention, measurements are automatically corrected for loss tangent, as taught in the abovereferenced application of Rau, whereas in another embodiment a corrected value of dielectric loss factor is utilized. To visualize these techniques, it is helpful to represent the real and imaginary parts of the propagation constant, $\gamma$, as $\beta$ and $\alpha$, respectively, so we have $$\gamma = \beta + j\alpha \tag{7}$$

where $\alpha$ is associated with wave attenuation or loss. (Note that the propagation constant is used in the well known wave equation in the form $e^{j\gamma}$, so the real part of the propagation constant becomes the imaginary part of the exponent and vice versa.) Squaring equations (6) and (7) and equating the real and imaginary parts of each gives $$\beta^2 - \alpha^2 = \mu\epsilon\omega^2 \tag{8}$$

$$2\alpha\beta = \mu\delta\omega \tag{9}$$

As used in the invention, $\beta$ and $\alpha$ of equations (7)–(9) are measured values, $\beta$ being determined from a velocity or phase measurement and $\alpha$ from an attenuation measurement. In terms of the above-discussed complex quantity representation of dielectric constant (i.e., $\epsilon^* = \epsilon' + j\epsilon''$), $\epsilon'$, i.e., the dielectric constant of the material under investigation if it were lossless, can be determined from equation (8) as $$\epsilon' = \frac{\beta^2 - \alpha^2}{\mu\omega^2} \tag{10}$$

The dielectric loss factor, $\epsilon''$, is expressed as $$\epsilon'' = \frac{2\alpha\beta}{\mu\omega^2} \tag{11}$$

The dielectric loss factor includes both conduction losses and losses attributable to relaxation effects, and can alternately be expressed as $$\epsilon'' = \frac{2\alpha'\beta'}{\mu\omega^2} + L(\omega) \tag{12}$$

where $\beta'$ and $\alpha'$ represent the phase and attenuation constants as if unaffected by relaxation effect losses, and $L(\omega)$ represents the losses attributable to relaxation effects.

Applicants have discovered that measurements of $\epsilon'$ and/or $\epsilon''$, or of quantities which depend on $\epsilon'$ and/or $\epsilon''$, taken in a borehole at first and second frequencies, can be utilized to determine the amount of adsorbed fluid in the formations surrounding the borehole position at which the measurements are taken.

Applicants have observed, for example, that $\epsilon'$ of adsorbed water, as determined from measurements at a first frequency below about 1 GHz ($10^9$ hertz) is substantially greater than $\epsilon'$ of the same adsorbed water as determined from measurements at a second frequency above about 1.1 GHz. At frequencies below about 1 GHz, and above about 1.1 GHz, the $\epsilon'$ vs. frequency characteristic of adsorbed water is generally flat so, in order to minimize any uncertainty as to the frequency band in which $\epsilon'$ of adsorbed water falls from its upper to its lower value, it is preferable to select the first frequency substantially below 1.0 GHz and the second frequency substantially above 1.1 GHz; e.g., at frequencies of 0.5 GHz and 1.5 GHz, respectively. Since the $\epsilon'$ of the free water has a generally flat frequency characteristic over the frequency range of interest, the contribution which the free water makes to the measurements will be the same at both the first and second frequencies, so the difference between the determined values at the first and second frequencies is indicative of the amount of adsorbed water in the formations.

Concerning $\epsilon''$, applicants have observed that when $\epsilon''$ is determined from measurements at a first frequency below about 0.6 GHz, for example at 0.33 GHz, and $\epsilon''$ is also determined from measurements at a second frequency of about 1 GHz, the relationship between the two determined values of $\epsilon''$ is substantially different for adsorbed water than it is for free water. It can be seen from equation (12) (in conjunction with the expression for conductivity derivable from equation (9)) that conductivity losses can be expected to decrease linearly with frequency. For example, measurements taken on a formation sample at a first frequency of 0.33 GHz and a second frequency of 1 GHz result in loss factor values respectively designated as $\epsilon_1''$ and $\epsilon_2''$. Relaxation losses at the first frequency are not substantial for either free water or bound water. Thus, for a formation containing substantially only free water the relationship between $\epsilon_1''$ and $\epsilon_2''$ can be expressed as $$\epsilon_2'' = \frac{\epsilon_1''}{H} + L_2 \qquad (13)$$

where H is the ratio of the first and second frequencies (3 for the indicated frequencies) and $L_2$ represents the losses at the second frequency attributable to relaxation effects. When adsorbed water is present, however, it is found that the measurements yield a substantially higher value of $\epsilon_2''$ than is the case for free water.

Accordingly, measurements taken at the first and second frequencies can be used to determine the relationship between the total water and the adsorbed water in the formations under investigation. Having determined a value of $\epsilon_1''$ from the measurement at the first frequency, the expected $\epsilon_2''$ for a formation containing almost exclusively free water can be determined from the relationship (13). The amount by which the actual $\epsilon_2''$ (obtained from the measurement at the second frequency) exceeds the expected $\epsilon_2''$ is qualitatively indicative of the amount of adsorbed water in the formations under investigation.

The information obtained from the derivations of both $\epsilon''$ and $\epsilon'$ can also be combined for determining the amount of adsorbed fluid in the formations being investigated. In particular, the loss tangent, defined as $\epsilon''/\epsilon'$, is obtained at two different frequencies and used to determine the amount of adsorbed water in the formations of interest. The following relationship is set forth, for a situation where only free water is present, to express the loss tangent, as measured at a second (higher) frequency in terms of the loss tangent measured at a first (lower) frequency:

$$\frac{\epsilon_2''}{\epsilon_2'} = \frac{\epsilon_1''}{H\epsilon_1'} + \frac{L_2}{\epsilon_1'} \qquad (14)$$

where, as above, $L_2$ represents the losses at the second frequency attributable to relaxation effects and H is the ratio of the frequencies. The relationship (14) is seen to be similar to relationship (13), except that each term is divided by an $\epsilon'$ term, and it should be borne in mind that for the free water case, $\epsilon_2' \approx \epsilon_1'$. When bound water is present in the formations, however, $\epsilon_2''$ is substantially higher than the equivalent measurement for the free water case (as noted above with respect to relationship (13) and also, if the second frequency is appropriately selected, $\epsilon_2'$ is substantially less than the comparable situation of free water only. Accordingly, the presence of bound water is reflected in both an increase in the numerator and a decrease in the denominator of the lefthand term of relationship (14).

Figure 7:
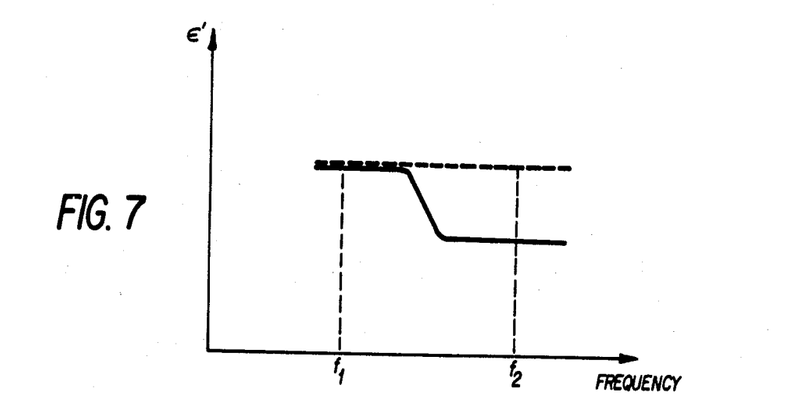
FIGS. 7, 8, and 9 are simplified graphs of dielectric constant, dielectric loss factor, and loss tangent for formations having either no adsorbed water or substantial adsorbed water.
Figure 8:
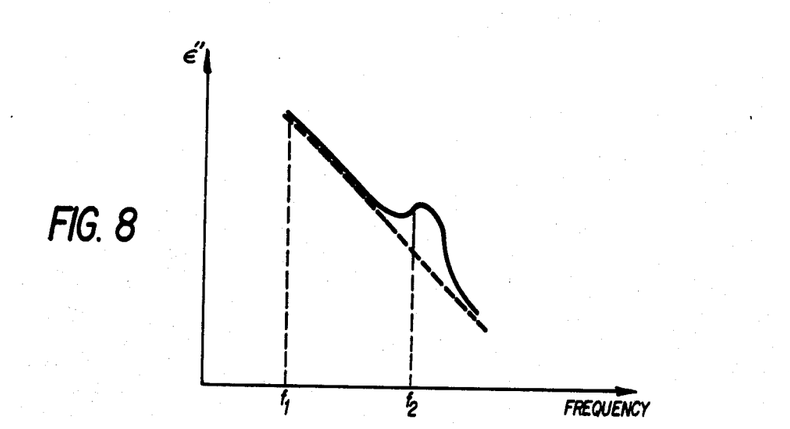
Figure 9:
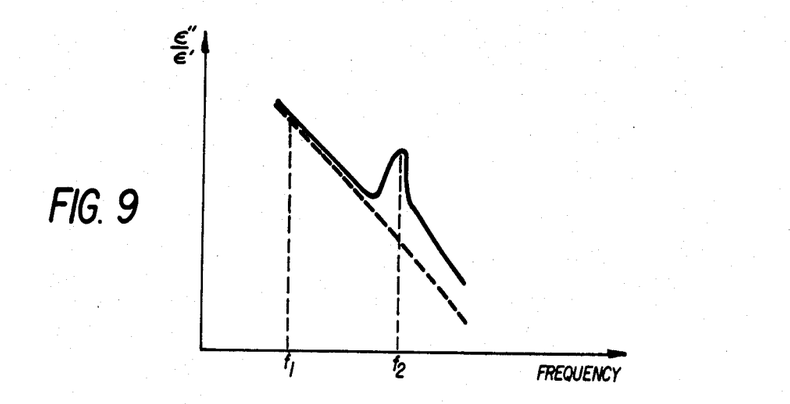

The described relationships of $\epsilon'$, $\epsilon''$, and $\epsilon''/\epsilon'$, at first and second frequencies, for situations where bound water is either present or absent, can be better understood from the simplified illustrations of FIG. 7, FIG. 8 and FIG. 9. In these FIGURES, the broken line represents a simplified graph for a measurement situation of no bound or adsorbed water (i.e., all "free" water), and the solid graph line represents a simplified graph of a measurement situation where a substantial amount of bound or adsorbed water is present. FIG. 7 is a simplified graph of $\epsilon'$ versus frequency. The above-described technique of using the difference between values determined at the two frequencies $f_1$ and $f_2$ (and noting that these frequencies may be different for the three FIGS. 7-9), is based on no substantial difference in the measurement of $\epsilon'$ being expected for the "free" water situation. In FIG. 8, simplified graphs of $\epsilon''$ are shown and, as described above, a situation of substantial bound water is indicated by a higher-than-expected measurement of $\epsilon''$ at the frequency $f_2$. Similarly, FIG. 9 illustrates simplified graphs of $\epsilon''/\epsilon'$. In this case, the peak of the curve for substantial bound water may be even more accentuated than in the FIG. 8 situation since the numerator of the ratio $\epsilon''/\epsilon'$ is approximately peaking while the denominator of this ratio is decreasing (as can be seen from FIGS. 7 and 8).

Figure 1:
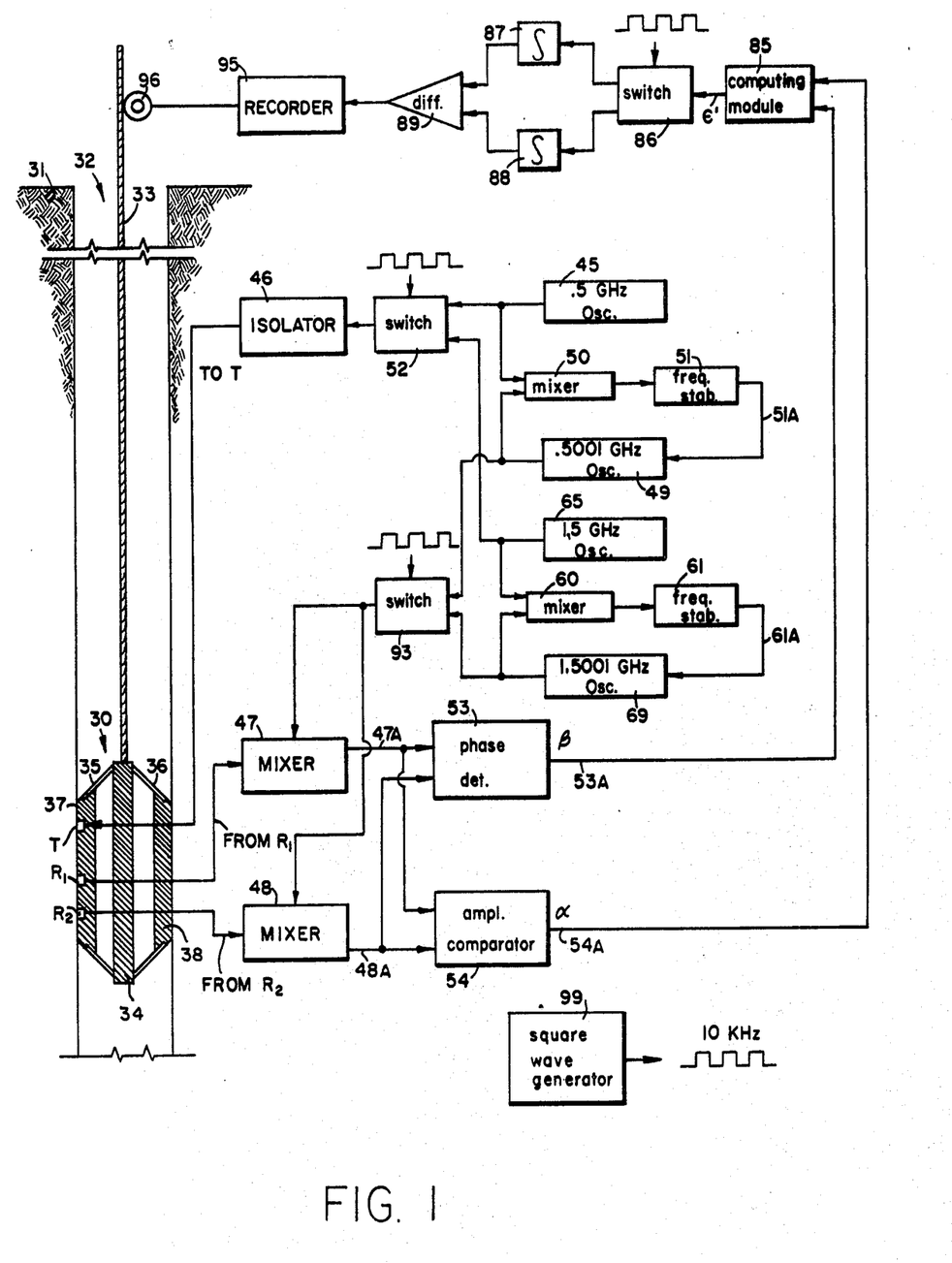
FIG. 1 is a schematic representation, partially in block diagram form, of an embodiment of the invention.

Referring to FIG. 1, there is shown a representative embodiment of an apparatus in accordance with the present invention for investigating subsurface formations 31 traversed by a borehole 32. The borehole 32 is typically filled with a drilling fluid or mud which contains finely divided solids in suspension. The investigating apparatus or logging device 30 is suspended in the borehole 32 on an armored cable 33, the length of which substantially determines the relative depth of the device 30. The cable length is controlled by suitable means at the surface such as a drum and winch mechanism (not shown).

The logging device 30 includes an elongated cylindrical support member 34, the interior portion of which has a fluid-tight housing containing the bulk of the downhole electronics. Mounted on support member 34 are a pair of bowed springs 35 and 36. The spring 35 has mounted thereon a pad member 37 which contains, inter alia, a transmitting antenna T and vertically spaced receiving antennas $R_1$ and $R_2$. The antennas may be of the type disclosed in the copending Rau application Ser.

No. 390,987. Mounted on the spring 36 is a secondary pad member 38 which may be an inactive pad that facilitates smooth vertical movement of the device 30 through the borehole. If desired, however, the pad 38 may contain electrodes or like additional means for investigating the surrounding formations. Electronic signals indicative of the information obtained by the logging device are transmitted through the cable 33 to a computing module 85 located at the surface of the earth. The particular means shown in FIG. 1 for maintaining the antennas in engagement with the borehole wall is illustrative, and it will be appreciated that other suitable means for accomplishing this objective, such as hydraulic means, can be utilized.

Figure 2:
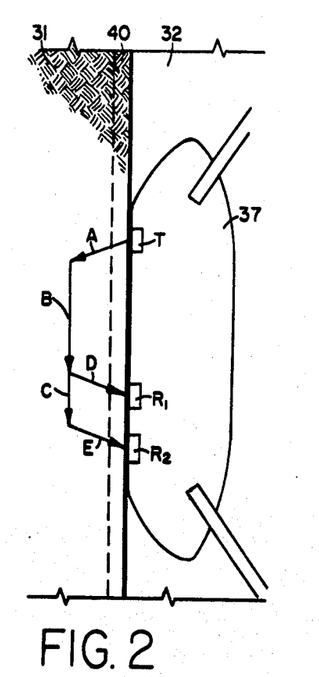
FIGS. 2 and 2A help illustrate, in simplified form, the nature of propagation of an electromagnetic lateral wave in a formation.
Figure 2A:
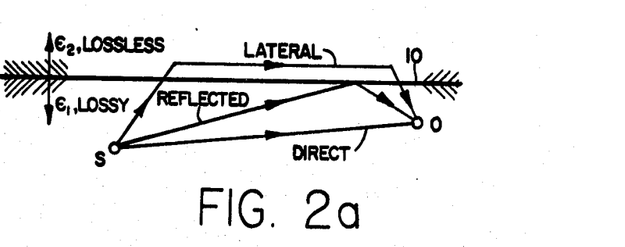

FIGS. 2 and 2A illustrates, in simplified form, the nature of propagation of the electromagnetic wave to be measured with the apparatus of FIG. 1. In FIG. 2 the pad 37 is shown positioned against the side of the borehole 32 which, as above-stated, is filled with a drilling mud. Generally, the fluid pressure in the formations traversed by a borehole is less than the hydrostatic pressure of the column of mud in the borehole, so that the mud and mud filtrate flows somewhat into the formations. The formations tend to screen the small particles suspended in the mud so that a mudcake varies with formation parameters such as permeability, but at least a very thin mudcake is usually present on the borehole wall. In FIG. 2, the pad 37 contacts a mudcake 40 which is shown as being of exaggerated scale thickness for illustrative clarity.

The transmitting antenna T emits microwave electromagnetic energy into the formation as represented by the arrow A. To understand the nature of the wave which propagates to the receivers, refer momentarily to FIG. 2A wherein there is shown an interface 10 between a lower lossy halfspace of dielectric constant $\epsilon_1$ and a lossless upper halfspace of dielectric constant $\epsilon_2$. It has been shown that the energy passing from a dipole-excited source "S" to an observation point "0" is definable as a "ground wave" which consists of three basic waves shown in FIG. 2A as "direct", "reflected", and "lateral" (or "surface") waves. The lateral wave constitutes the dominant portion of the field at and close to the interface, especially when the distance between points S and 0 is large as compared to their respective distances from the interface. The lateral wave starts at the source in the lossy media and proceeds as a ray toward the interface in a direction associated with the critical angle, $\theta$, which is defined by $$\sin \phi = \frac{\epsilon_2}{\epsilon_1}.$$

The wave travels along the boundary but within the lossless media and it continuously sheds energy back into the lossy medium. The direct and reflected waves are confined to the lossy media. These waves are attenuated at an exponential rate which is much faster than the algebraic rate at which the lateral wave is attenuated.

The principles of the idealized situation of FIG. 2A can be applied to a case where the upper half-space is smaller than that of the lower half-space. In FIG. 2, the conditions necessary for the excitation of lateral waves are generally present when a water-base mud is being used. Water-base muds have a relatively high conductivity, and mudcakes formed therefrom can be expected to have a relatively high dielectric constant (due to a high water content) as well as a relatively high conductivity. Thus, the mudcake can be thought of as the lossy lower half-space and the adjacent formation as a relatively low-loss upper half-space. Since it is expected that the dielectric constant of the mudcake will be considerably higher than that of the adjacent formation, the critical angle (i.e., the angle at which the energy in the lateral wave enters the formation) will be relatively small.

The lateral wave propagating in the formation is represented by the arrow B and its extension, arrow C. As above-stated, the lateral wave continuously sheds energy back into the more lossy media, and the portions of energy which are shed at the approximate locations of the receivers $R_1$ and $R_2$ are represented by the arrows D and E, respectively. If the pathlengths represented by arrows D and E are assumed to be substantially equal, it is seen that the difference in pathlength between the energy received at $R_1$ (via path A-B-D) and the energy received at $R_2$ (via path A-B-C-E) is the distance represented by arrow C; i.e., the distance between the receivers. Accordingly, a differential receiver arrangment allows investigation of the portion of the formation lying approximately opposite the separation between $R_1$ and $R_2$.

Referring again to FIG. 1, the downhole electronics contained within the member 34 are shown, for convenience of illustration, at the side of the borehole. Solid state oscillators 45 and 65 provide output energy in the microwave region of the spectrum. The microwave region is defined herein as including the range of frequencies between about 300 MHz and 300 GHz. In the present embodiment, the oscillators 45 and 65 operate at frequencies of 0.5 GHz and 1.5 GHz, respectively, but it will be understood that other suitable frequencies can be utilized, with the preferred range being above about 1.1 GHz for the higher frequency and below about 1.0 GHz for the lower frequency. The outputs of oscillators 45 and 65 are alternately coupled, via switch 52 and isolator 46, to the transmitting antenna T. (As will be described further hereinbelow, the switches 52, 93 and 86 are alternately switched in synchronism, so that the system operates during alternate intervals at the 0.5 GHz and 1.5 GHz frequencies.) Microwave energy is transmitted into the surrounding formations and propagates through the formations in the manner previously described. The energy which arrives at the receiving antennas $R_1$ and $R_2$ is respectively coupled to input terminals of the mixers 47 and 48. As discussed above, the signals which arrive from $R_1$ and $R_2$ are out of phase with each other by an amount which depends on the phase constant $\beta$ and have an amplitude ratio which depends on the attenuation constant $\alpha$. Secondary input terminals of the mixers 47 and 48 are supplied with microwave energy at frequencies that are separated from the transmitter frequencies by some relatively low frequency that is typically in the radio frequency range. In the illustrative embodiment, solid state oscillators 49 and 69 alternately supply microwave energy to mixers 47 and 48 via switch 93, the microwave energy being supplied at frequencies of 0.5001 GHz and 1.5001 GHz, respectively, or 100 KHz above the corresponding transmitter frequencies. The output signals 47A and 48A of the mixers 47 and 48 therefore contain the difference frequency of 100 KHz. In accordance with well known principles, the signals 47A and 48A maintain the phase and amplitude relationships of the signals from $R_1$ and $R_2$, but the task of phase detection is greatly facilitated at the lower frequency of the mixed signals.

To insure that the difference frequencies between the outputs of oscillators 45 and 49 and between oscillators 65 and 69 both remain at 100 KHz, a pair of "phase-locked loop" configurations are utilized. Specifically, the outputs of oscillators 45 and 49 are sampled and fed to a mixer 50 whose output is, in turn, received by a frequency stabilization circuit 51 which detects drifts from the 100 KHz standard and generates a correction signal 51A which controls oscillator 49 in the manner of a conventional "phase-locked loop". Similarly, mixer 60 and frequency stabilization circuit 61 operate to lock the difference between oscillators 65 and 69 at the 100 KHz standard.

Figure 3:
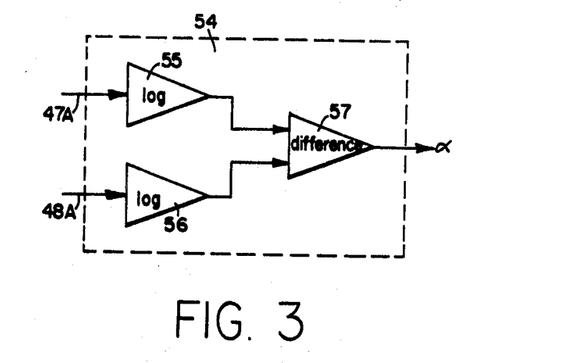
FIG. 3 is a block diagram of the amplitude comparator of FIG. 1.

The signals 47A and 48A are applied to a phase detector circuit 53 and to an amplitude comparator 54. The output of the phase detector 53 is a signal level which is proportional to the phase difference between the signals received at $R_1$ and $R_2$, and thus proportional to $\beta$ in accordance with $\beta = \phi/W$, where W is the distance separating the two receivers. (As indicated above, in instances where the loss tangent is much less than unity, this $\beta$, which is a measure of velocity, could be used to determine dielectric constant, as is clear from equations for the lossless case, but in the present preferred embodiment a loss correction technique is used.) The output of amplitude comparator 54 is a signal level which is proportional to the attenuation constant $\alpha$. A convenient circuit 54 for obtaining an output signal proportional to $\alpha$ is shown in FIG. 3. The signals 47A and 48A are respectively applied to the logarithmic amplifiers 55 and 56 whose outputs are fed to the difference amplifier 57. The output of the difference amplifier 57 is a signal level proportional to $\alpha$. This can be visualized by representing the amplitude of the wave energy received at $R_1$ as $Ae^{-\alpha z}$, where A is an amplitude constant and z is the distance separating T and R. It follows that the amplitude of the wave energy received at $R_2$ is $Ae^{-\alpha(z+W)}$, where W is the distance separating the receivers $R_1$ and $R_2$. The ratio of the wave amplitudes at the two receivers is therefore $Ae^{-\alpha(z+W)}/Ae^{-\alpha z} = e^{-\alpha W}$ The log of the ratio of the wave amplitudes is therefore proportional to $\alpha$. It will be appreciated that the circuit 54 of FIG. 3 accomplishes the same mathematical result by taking the difference of the logs of the wave amplitudes.

The outputs of the phase detector circuit 53 and the amplitude comparison circuit 54 are transmitted to the surface over the conductor pair 53A and 54A which in actuality pass through the armored cable 33. Typically, these signals are D.C. levels which are stepped-up by amplification before transmission to the surface.

Figure 4:
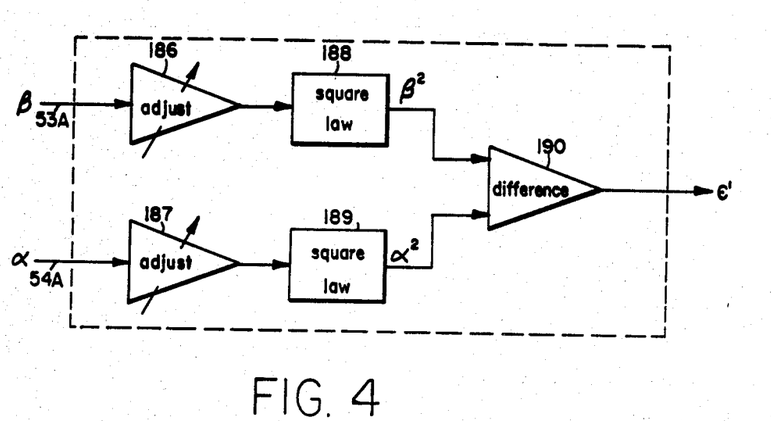
FIG. 4 is a block diagram of the computing module of FIG. 1.

At the surface of the earth the signals on lines 53A and 53B are applied to a computing module 85 which produces a signal proportional to the loss-corrected value of the dielectric constant measured by the downhole investigating apparatus in accordance with the equation (10). FIG. 4 is a block diagram of the computing module 85 which receives the signals on lines 53A and 54A that are indicative of measured values of $\beta$ and $\alpha$, respectively. The signals are first applied to variable gain amplifiers 186 and 187 which can be utilized for calibration. The amplifier outputs are fed to conventional square law circuits 188 and 189 which produce signals proportional to $\beta^2$ and $\alpha^2$. These signals are applied to a difference amplifier 190 which produces an output proportional to $\beta^2 - \alpha^2$. From equations (8) and (10), and the accompanying text, it is clear that this output is a measure of $\epsilon'$. Calibration for particular system parameters such as frequency can be accomplished with the amplifiers 186 and 187. The described derivation of $\epsilon'$ is preferable but, as noted above, $\epsilon'$ can be obtained, if desired, without a loss correction.

The signal proportional to $\epsilon'$ is alternately coupled, via switch 86, to integrators 87 and 88, the integrator 87 generating an output which is a measure of $\epsilon'$ as determined using microwave energy at a frequency of 0.5 GHz, and the integrator 88 generating an output which is a measure of $\epsilon'$ as determined using microwave energy at a frequency of 1.5 GHz. The output of integrator 88 is subtracted from the output of integrator 87 by difference amplifier 89 and the output of difference amplifier 89 is, in turn, recorded by a recorder 95 which is conventionally driven as a function of borehole depth by mechanical coupling to a rotating wheel 96. The wheel 96 is coupled to the cable 33 and rotates in synchronism therewith so as to move as a function of borehole depth. Accordingly, a measure of the adsorbed water is recorded as a function of borehole depth by the recorder 95.

Operation of the system of FIG. 1 is as follows: A square wave generator 90 generates a 10 KHz square wave which controls the switches 52, 93 and 86. During the positive cycle of this square wave, the 0.5 GHz portion of the system is operative; i.e., the switch 52 passes the output of oscillator 45 to the transmitting antenna and the switch 93 passes the output of oscillator 49 to the mixers 47 and 48 to detect the quantities necessary for obtaining the $\beta$ and $\alpha$ of microwave energy propagating at a frequency of 0.5 GHz. Also, during the positive cycles the switch 86 is operative to couple the output of module 85 to integrator 87. The integrator 87 is provided with a time constant which is longer than a substantial number of cycles of the square wave, so the output of integrator 87 represents an averaged value of $\epsilon'$ as measured using the 0.5 GHz microwave energy. During the negative cycles of the square wave, the 1.5 GHz portion of the system is operative; i.e., switch 52 passes the output of oscillator 65 to the transmitting antenna and switch 93 passes the output of oscillator 69 to mixers 47 and 48 to detect the quantities necessary for obtaining the $\alpha$ and $\beta$ of microwave energy propagating at a frequency of 1.5 GHz. During these negative cycles the switch 86 couples the output of module 85 to integrator 88, which also has a time constant longer than a substantial number of cycles of the square wave, so that integrator 88 represents an averaged value of $\epsilon'$ as measured using microwave energy at 1.5 GHz.

Figure 5:
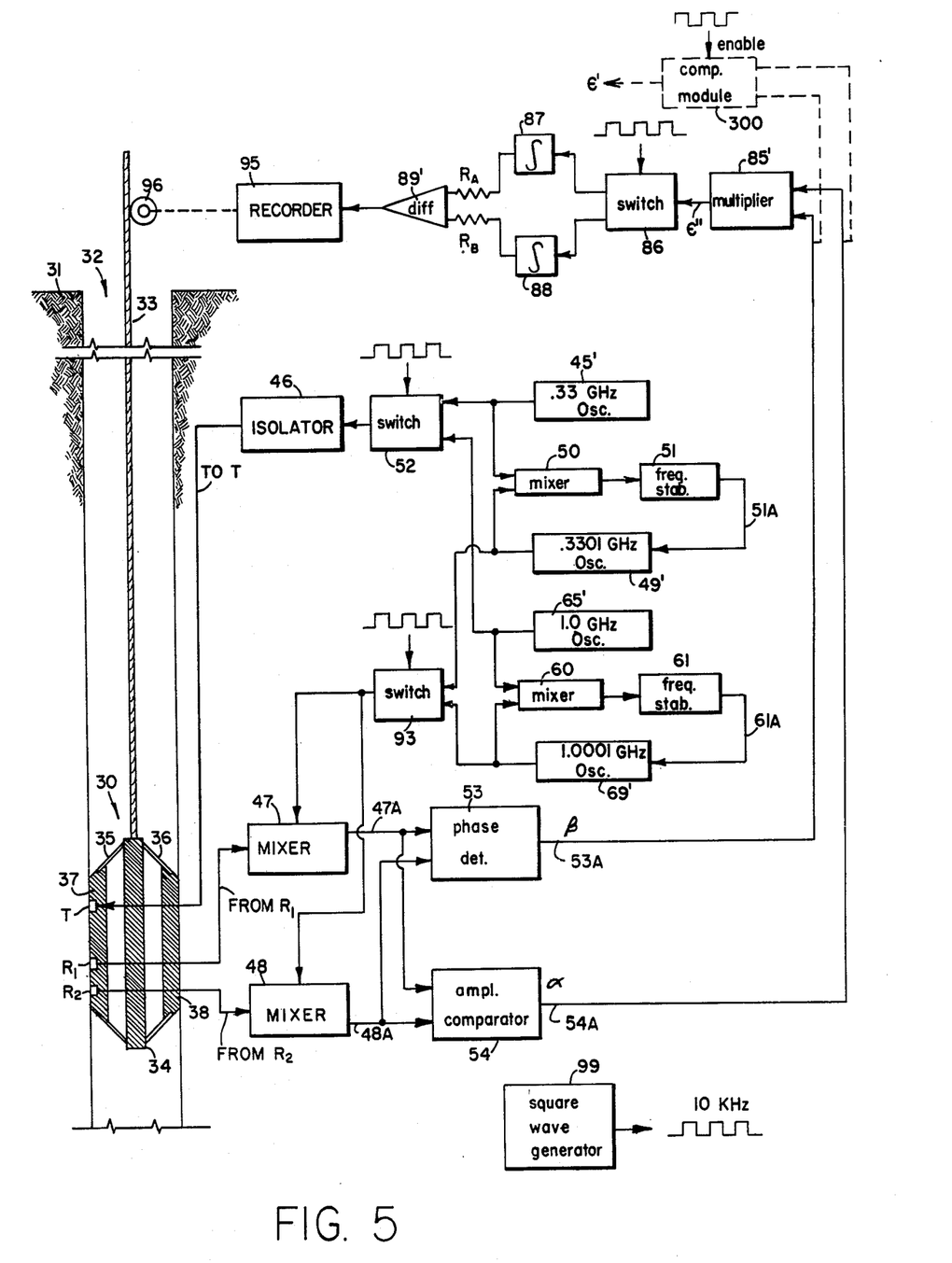
FIG. 5 is a schematic representation, partially in block diagram form, of another embodiment of the invention.

Referring to FIG. 5, there is shown another embodiment of the invention wherein the dielectric loss factor of the formations is determined at first and second frequencies, and utilized in obtaining an indication of the amount of adsorbed fluid in the formations surrounding the borehole 32. FIG. 5 differs structurally from FIG. 1 in the following respects: oscillators 45' and 49' operate at 0.33 GHz and 0.3301 GHz, respectively and oscillators 65' and 69' operate at 1.0 GHz and 1.0001 GHz, respectively; the computing module 85' comprises a multiplier which generates an output that is proportional to the product $\alpha\beta$ and thus representative of $\epsilon''$; difference amplifier 89' receives the outputs of integrators 87 and 88 via weighting resistors $R_A$ and $R_B$, respectively, which are of a ratio such that the output of integrator 88 is applied to the difference amplifier 89' with three times the weight of the output of integrator 87.

Operation of the system of FIG. 5 is as follows: during the positive cycles of the square wave, the 0.33 GHz portion of the system is operative and during the negative cycles of the square wave the 1 GHz portion of the system is operative. The quantities $\alpha$ and $\beta$, at these frequencies, are detected in the manner described with reference to FIG. 1. The multiplier 85' generates an output which is proportional to $\epsilon''$ in accordance with equations (9) and (11) above (relaxation losses to be subsequently accounted for). Accordingly, the output of integrator 87 represents an averaged value of $\epsilon''$ as measured using the 0.33 GHz energy and the output of integrator 88 represents an averaged value of $\epsilon''$ as measured using the microwave energy at 1.0 GHz. As described above, these values should be related in accordance with equation (13) for formations containing substantially only free water, so the output of difference amplifier 89' (i.e., the amount by which the weighted output of integrator 87 exceeds the weighted output of integrator 88) is qualitatively indicative of the amount of adsorbed water in the formations under investigation. The expected losses attributable to relaxation effects for an exclusively free water condition ($L_2$ of equation (12)) will appear as an output reference level on recorder 95. Stated another way, the output of difference amplifier 89 can be expressed as $\epsilon_2'' - \epsilon''_1/3 + L_2$.

In FIG. 5 a computing module 300, illustrated in dashed line, is shown as receiving the signals representative of $\alpha$ and $\beta$. The module 300, which may be as described in the abovereferenced copending application Ser. No. 390,987 of R. Rau, is enabled by the negative cycles of the clock to operate only at the 1.0 GHz frequency. The loss-corrected dielectric constant of the formations can thereby be determined in accordance with the principles set forth in the Rau application. Also, it will be appreciated that three or more frequencies could be provided, if desired, to obtain multiple measurements.

Figure 6:
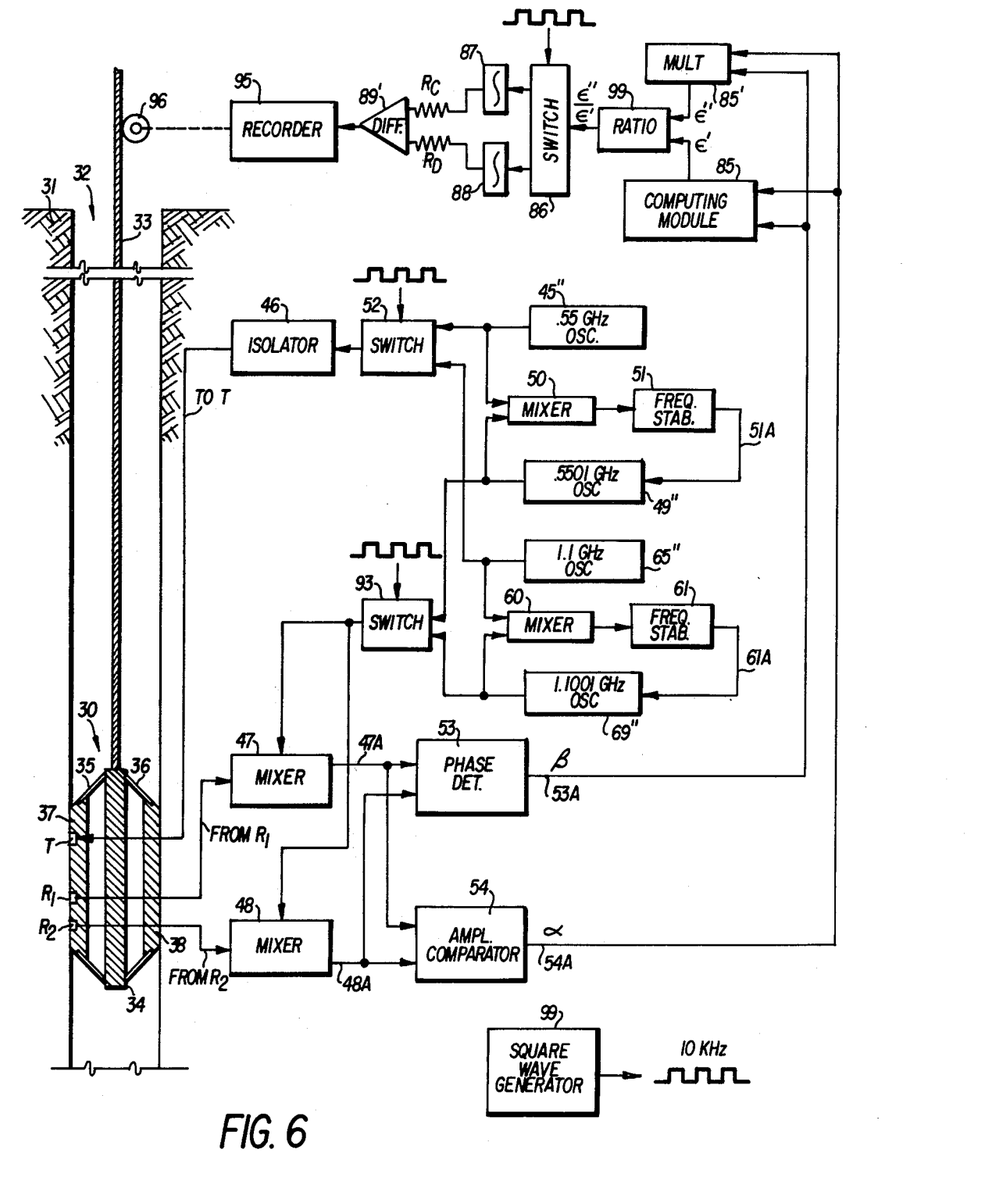
FIG. 6 is a schematic representation, partially in block diagram form, of another embodiment of the invention.

Referring to FIG. 6, there is shown a further embodiment of the invention wherein the loss tangent of the formations is determined at first and second frequencies, and utilized in obtaining an indication of the amount of adsorbed fluid in the formations surrounding a borehole 32. FIG. 6 differs structurally from FIG. 5 in the following respects: Oscillators 45" and 49" operate at 0.55 GHz and 0.5501 GHz, respectively, and oscillators 65''' and 69" operate at 1.1 GHz and 1.1001 GHz, respectively; computing modules 85' and 85 respectively produce signals representative of $\epsilon''$ and $\epsilon'$ (as described in conjunction with FIGS. 1 and 5), and the loss tangent, $\epsilon''/\epsilon'$ is generated by a ratio circuit 99 which receives the output of the units 85' and 85. The use of switch 86, integrators 87 and 88, and difference amplifier 89', are as described in conjunction with FIG. 5, except that weighting resistors $R_C$ and $R_D$ are of the ratio such that the output of integrator 88 is applied to the difference amplifier 89' with two times the weight of the output of integrator 87.

Operation of the system of FIG. 6 is as follows: During the positive cycles of the square wave, the 0.55 GHz portion of the system is operative and during the negative cycles of the square wave the 1.1 GHz portion of the system is operative. The output of the integrator 87 represents an average value of $\epsilon''/\epsilon'$ as measured using the 0.55 GHz energy and the output of the integrator 88 represents an average value of $\epsilon''/\epsilon'$ as measured using the energy at 1.1 GHz. As described above, these values should be related in accordance with equation (14) for formations containing substantially only free water, so the output of difference amplifier 89' (i.e., the amount by which the weighted output of integrator 87 exceeds the weighted output of integrator 88) is qualitatively indicative of the amount of adsorbed water in the formations under investigation. As in FIG. 5, the expected losses attributable to relaxation effects for an exclusively free water condition ($L_2/\epsilon_1$ of equation (14)) will appear as a negative output reference level on recorder 95. Again, it is noted that more than two frequencies can be utilized, if desired.

The invention has been described with reference to a particular embodiment, but it will be appreciated that variations within the spirit and scope of the invention will occur to those skilled in the art. For example, while a technique is disclosed for utilizing the same transmitter and receivers in conjunction with both electromagnetic frequencies, it will be understood that separate sets of transmitters and receivers could be employed. Also, it should be noted that the advantageous principles of known borehole compensation techniques and/or of redundant processing channels disclosed in U.S. Pat. No. 3,849,721, assigned to applicant's assignee, can be utilized, if desired, in conjunction with the present invention. Further, it will be appreciated that reasonable variations in the frequencies set forth can be utilized. For example, in the embodiment of FIG. 5 the measurements taken at the second frequency are intended for use in detecting characteristics of the dielectric loss factor of water which occur at about 1 GHz, but the effect is present over a range of frequencies around 1 GHz, so selection can be made of a suitable frequency above or below 1 GHz, e.g. between about 0.9 GHz and 1.2 GHz. Also, it will be understood that the values of $\alpha$ and $\beta$ can be corrected for mudcake effect, such as from a caliper signal. Finally, since relaxation effects can be effected by temperature, downhole temperature measurements can be taken and appropriate corrections implemented.

I claim:

1. Apparatus for determining the amount of adsorbed fluid in formations surrounding a borehole, comprising:
    means for deriving a first quantity which is a function of the loss tangent of said formations as measured by passing electromagnetic energy of a first frequency through said formations;
    means for deriving a second quantity which is a function of the loss tangent of said formations as measured by passing electromagnetic energy of a second frequency through said formations; and
    means for determining the amount of adsorbed fluid in said formations as a function of said first and second quantities.

2. An apparatus as defined by claim 1 wherein the loss tangent is derived as a ratio of the imaginary and real components of the complex dielectric constant of said formations.

3. An apparatus as defined by claim 1 wherein said means for deriving said first and second quantities comprise means for transmitting microwave electromagnetic energy through said formations and for measuring the relative attenuation and relative phase shift of said microwave electromagnetic energy.

4. An apparatus as defined by claim 1 wherein said means for determining the amount of adsorbed fluid comprises means for detecting the weighted difference between said first and second quantities.

5. An apparatus as defined by claim 3 wherein said means for determining the amount of adsorbed fluid comprises means for detecting the weighted difference between said first and second quantities.

6. An apparatus as defined by claim 1 wherein said second frequency is about 1.1 GHz.

7. An apparatus as defined by claim 4 wherein the weightings of said weighted difference are a function of the ratio of said first and second frequencies.

8. An apparatus as defined by claim 5 wherein the weightings of said weighted difference are a function of the ratio of said first and second frequencies.

9. An apparatus as defined by claim 2 wherein the weightings of said weighted difference are a function of the ratio of said first and second frequencies.

10. A method of determining the amount of adsorbed fluid in formations surrounding a borehole, comprising the steps of:

deriving a first quantity which is a function of the loss tangent of said formations as measured by passing electromagnetic energy of a first frequency through said formations;

deriving a second quantity which is a function of the loss tangent of said formations as measured by passing electromagnetic energy of a second frequency through said formations; and determining the amount of adsorbed water in said formations as a function of said first and second quantities.

11. A method as defined by claim 10 wherein the loss tangent is derived as a ratio of the imaginary and real components of the complex dielectric constant of said formations.

12. A method as defined by claim 10 wherein the steps of deriving said first and second quantities includes the steps of transmitting microwave electromagnetic energy through said formations and measuring the relative attenuation and relative phase shift of the microwave electromagnetic energy.

13. A method as defined by claim 10 wherein said step of determining the amount of adsorbed fluid comprises the step of detecting the weighted difference between said first and second quantities.

14. A method as defined by claim 12 wherein the step of determining the amount of adsorbed fluid comprises the step of detecting the weighted difference between said first and second quantities.

15. A method as defined by claim 12 wherein said second frequency is about 1.1 GHz.

16. A method as defined by claim 13 wherein the weightings of said weighted difference are a function of the ratio of said first and second frequencies.

17. A method as defined by claim 11 wherein said step of determining the amount of adsorbed fluid comprises the step of detecting the weighted difference between said first and second quantities.

18. Apparatus for determining the amount of adsorbed water in formations surrounding a borehole, comprising:

means for injecting microwave electromagnetic energy at first and second frequencies into the surrounding formations;

means for measuring the relative attenuation and relative phase shift of the microwave electromagnetic energy passing through a given portion of the surrounding formations;

means for deriving a first quantity which is indicative of the loss tangent of the given portion of the formations by combining the attenuation and phase measurements taken at said first frequency;

means for deriving a second quantity which is indicative of the loss tangent of the given portion of the formations by combining the attenuation and phase measurements taken at said second frequency; and means for determining the amount of adsorbed water in said given portion of the surrounding formations as a function of said first and second quantities.

19. An apparatus as defined by claim 18 wherein the loss tangent is derived as a ratio of the imaginary and real components of the complex dielectric constant of said formations.

20. An apparatus as defined by claim 18 wherein said means for determining the amount of adsorbed water comprises means for detecting the weighted difference between said first and second quantities.

21. An apparatus as defined by claim 18 wherein said second frequency is about 1.1 GHz.

22. An apparatus as defined by claim 20 wherein the weightings of said weighted difference are a function of the ratio of said first and second frequencies.

23. A method for determining the amount of adsorbed water in formations surrounding a borehole, comprising the steps of:

injecting microwave electromagnetic energy at first and second frequencies into the surrounding formations;

measuring the relative attenuation and relative phase shift of the microwave electromagnetic energy passing through a given portion of the surrounding formations;

deriving a first quantity which is indicative of the loss tangent of the given portion of the formations by combining the attenuation and phase measurements taken at said first frequency;

deriving a second quantity which is indicative of the loss tangent of the given portion of the formations by combining the attenuation and phase measurements taken at said second frequency; and determining the amount of adsorbed water in said given portion of the surrounding formations as a function of said first and second quantities.

24. A method as defined by claim 23 wherein the loss tangent is derived as a ratio of the imaginary and real components of the complex dielectric constant of said formations.

25. A method as defined by claim 23 wherein the step of determining the amount of adsorbed water comprises the step of detecting the weighted difference between said first and second quantities.

26. A method as defined by claim 23 wherein said second frequency is about 1.1 GHz.

27. A method as defined by claim 25 wherein the weightings of said weighted difference are a function of the ratio of said first and second frequencies.

* * * * *

UNITED STATES PATENT AND TRADEMARK OFFICE
CERTIFICATE OF CORRECTION

PATENT NO. : 4,151,457  Page 1 of 2
DATED : April 24, 1979
INVENTOR(S) : Rama N. Rau It is certified that error appears in the above-identified patent and that said Letters Patent are hereby corrected as shown below:

col. 1, line 64 change "$\varepsilon$" to --$\varepsilon'$-- col. 5, line 37 the equation should be --$\beta = \omega\sqrt{\mu\varepsilon}$-- col. 5, line 55 equation (6) should be --$\gamma = \omega\sqrt{\mu\varepsilon}\sqrt{1 + j\frac{\sigma}{\omega\varepsilon}}$-- col. 5, line 58 change "$\delta$" to --$\sigma$-- col. 5, line 58 change "$\delta/\omega\varepsilon$" to --$\sigma/\omega\varepsilon$-- col. 5, line 61 change "$\delta$" to --$\sigma$-- col. 5, line 62 change "$\delta/\omega\varepsilon$" to --$\sigma/\omega\varepsilon$-- col. 5, line 63 the equation should be --$\gamma = \beta = \omega\sqrt{\mu\varepsilon}$-- col. 5, line 64 change "$\delta$" to --$\sigma$-- col. 5, line 67 change "$\delta/\omega\varepsilon$" to --$\sigma/\omega\varepsilon$-- col. 6, line 2 change "$\delta/\omega\varepsilon$" to --$\sigma/\omega\varepsilon$-- col. 6, line 31 equation (9) should be --$2\alpha\beta = \mu\sigma\omega$-- col. 9, line 50 the equation should be

--$\sin\theta = \sqrt{\frac{\varepsilon 2}{\varepsilon 1}}$-- col. 9, line 60 after "the" insert --dielectric constant of the--

UNITED STATES PATENT AND TRADEMARK OFFICE
CERTIFICATE OF CORRECTION

PATENT NO. : 4,151,457

DATED : April 24, 1979

INVENTOR(S) : Rama N. Rau

It is certified that error appears in the above–identified patent and that said Letters Patent are hereby corrected as shown below:

col. 11, line 36, change "R" to --$R_1$--

Signed and Sealed this

Sixth Day of November 1979

[SEAL]

Attest:

RUTH C. MASON
Attesting Officer

LUTRELLE F. PARKER
Acting Commissioner of Patents and Trademarks